Figure 1:
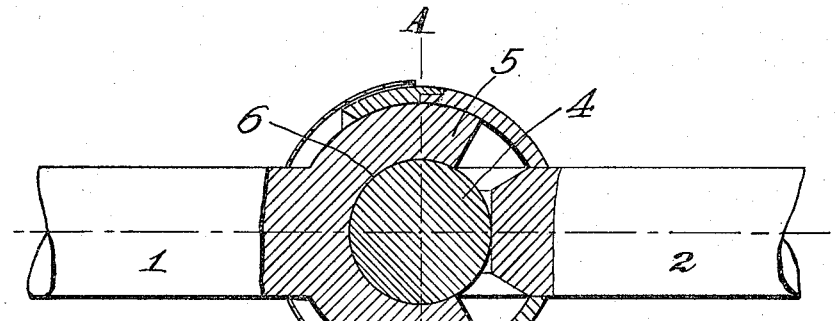

A. G. BOWEN.
UNIVERSAL JOINT.
APPLICATION FILED JUNE 28, 1909.

1,145,400.

Patented July 6, 1915.

Witnesses:
Abiel Bowen
Helen C Bowen

Inventor:
Asa G. Bowen

UNITED STATES PATENT OFFICE.

ADNA G. BOWEN, OF MEDINA, NEW YORK.

UNIVERSAL JOINT.

1,145,400.  Specification of Letters Patent.  Patented July 6, 1915.

Application filed June 28, 1909. Serial No. 504,728.

*To all whom it may concern:*

Be it known that I, ADNA G. BOWEN, a citizen of the United States, residing in the village of Medina, in the county of Orleans and State of New York, have invented a certain new and useful Improvement in Universal Joints; and I do hereby declare the following to be a full, clear, and exact description of the invention, such as will enable others skilled in the art to which it appertains to make and use the same.

My invention relates to universal joints, and has for its object the production of a strong, simple and reliable universal joint adapted to withstand severe strain and afford the greatest capacity and strength.

The object of my invention is accomplished by the construction and arrangement illustrated in the accompanying drawings, in which—

Figure I. is a central longitudinal section of the casing and a partial section and partial elevation of the universal joint. Fig. II. is a central transverse section of the same on the line A B. Fig. III. is an elevation of a shaft member of the universal joint. Fig. IV. is a partial sectional view of the plan of the same. Fig. V. is an elevation of the block.

Like reference numerals in the several figures denote the same parts.

The universal joint forming the subject matter of the present invention is illustrated in the accompanying drawings in connection with the two shaft members numbered 1 and 2, respectively, and embodies in its construction two jaws each having an internal cylindrical bearing surface, said jaws being arranged at substantially right angles to each other and embracing between them a connecting block which is provided with cylindrical bearing surfaces arranged with their axes at substantially right angles to each other, said bearing surfaces on the block being substantially of uniform diameter from end to end of the block, whereby the members may be assembled or separated by a sliding movement longitudinally of the axes of the bearing surfaces.

Figure 2:
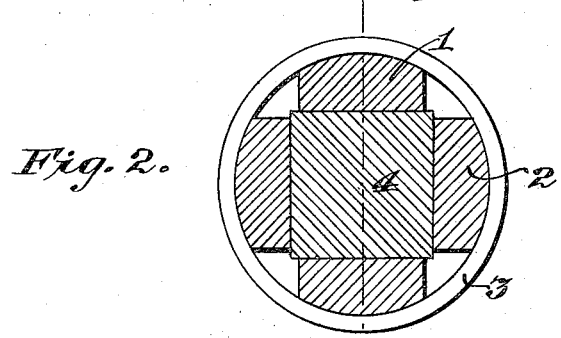
Figure 3:
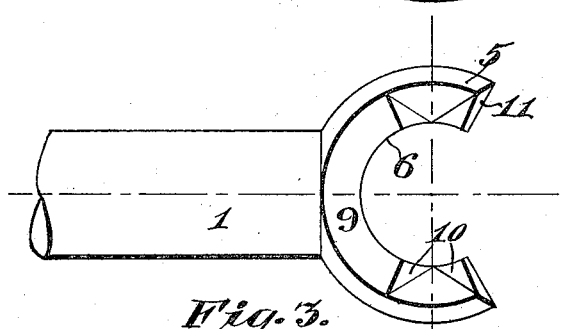

Each shaft member 1 and 2 is formed with a bifurcated terminal best seen in Fig. 3, where the arms are indicated by the numeral 5 and the internal cylindrical bearing surface by the numeral 6. This bearing surface, it will be noted, extends for an angular distance about its axis a greater number of degrees than the half circle and consequently, when in engagement with its coöperating bearing, can only be displaced therefrom by a movement longitudinally of the axis of the bearing. From Fig. 2 it will be seen that the length of each bearing or the width of the terminal arms 5 is preferably less than the opening between the ends of the coöperating arms, whereby one of the jaws formed by the arms may pass through the other jaw in assembling or separating the parts.

Figure 5:
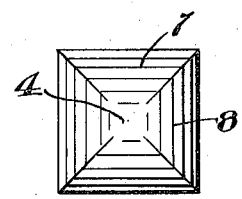
Figure 4:
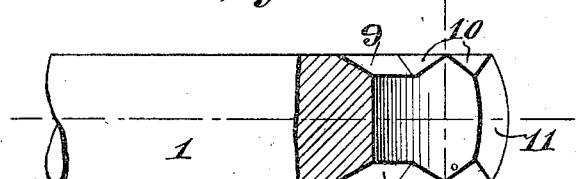

For coöperation with the oppositely disposed jaws having the internal cylindrical bearings there is provided a connecting block 4, which block is provided with cylindrical bearing surfaces 7 and 8, Fig. 5, the axes of which cylindrical bearing surfaces are arranged at substantially right angles to each other and in substantially a single plane. Inasmuch as each of the cylindrical bearing surfaces on the block is of substantially uniform diameter from end to end, the block presents a rectangular appearance and is substantially rectangular in cross section in the plane of the axes of the bearing surfaces, as shown in said Fig. 5. This construction affords extended cylindrical bearing surfaces between the members of the joint which, while permitting of the greatest freedom of movement, offer a maximum resistance to wear.

Where it is desired to provide for the members taking a wide angle or range of movement with relation to each other, the edges of the jaws may be cut away, forming inclined surfaces 9 and 10 which will give increased clearance for the ends 11 of the coöperating jaw, and at the same time the only metal removed will be such as is required for the movement of the jaws with relation to each other. In other words, the entire area of clearance between the jaws is necessary for the movement of the jaws in making a complete revolution when the two members are at the greatest angle permitted by the joint.

Inasmuch as the oppositely disposed bifurcated terminals forming the jaws and the connecting block can only be assembled or separated by relative movement longitudinally of the axes of the cylindrical bearing surfaces, some means should be provided for restraining such movement in order to hold the parts in their proper assembled position. The means preferably adopted is a casing which will inclose the jaw members with an annular internal bearing surface, as shown in Fig. 2, where the casing is indicated by the reference numeral 3. Conveniently, the outer faces of the jaws formed by the arms 5 and the inner face of the casing 3 are spherical, and the casing therefore takes the form of a sphere with portions cut away for the passage of the members connected by the joint. As shown in Fig. 1, the spherical casing 3 is formed in halves adapted to be joined together, one half having an opening therein which will fit one of the shaft ends snugly, while the other half is provided with a larger opening 3ª which will permit of the angular disposition of the shaft members with relation to each other. For closing the opening 3ª, the casing may embody a third shell which is semispherical in form, as indicated at 3ᵇ, and having an opening therein which will fit the shaft member 1 and bridge the opening 3ª in any position which may be assumed by the shaft. With this construction the essential working members of the joint, to wit: the oppositely disposed jaws and connecting block, are practically entirely inclosed by the casing, whereby dirt is excluded and grease or lubricant retained.

It will be noted that the restraining member formed by the casing is not fastened or secured to the connecting block, and it is not necessary that it be designed for withstanding longitudinal stress, so that it may obviously be of different form and construction from that illustrated in the drawings, and I do not, therefore, wish to be limited to any particular construction of the restraining member, as it is only essential that some means be provided for retaining the jaws and block in their proper operative relationship after they have been assembled by relative movement longitudinally of the axes of the bearing surfaces. Some form of casing however is preferred, as it presents obvious advantages in addition to its function of maintaining the parts in their proper relative positions, but in every instance where a casing is employed, as illustrated in the drawings, it is preferred that the casing should be free from any positive attachment to any of the parts, whereby it may travel independently during the action of the joint so as to prevent unequal wear at any particular point on its bearing surface.

To disconnect the joint it is only necessary to separate the two sections of the casing and slip one or the other of the jaws off of the connecting block by movement longitudinally of the axes of the bearing surfaces between the block and member, and this may be accomplished without the necessity of moving the shafts longitudinally an advantage which will be readily appreciated by those having to connect or disconnect joints of this character where used between the proximate ends of power shafts.

Having thus described my invention, what I claim as new and desire to secure by Letters Patent of the United States, is:

1. A universal joint embodying members having oppositely-disposed bifurcated terminals forming jaws, each jaw having an internal cylindrical bearing of uniform diameter from end to end, and a connecting block having cylindrical bearing surfaces of substantially uniform diameter from end to end, the axes of the bearing surfaces being at right angles to each other in a single plane, and the block being substantially rectangular in the plane of the axes, whereby the parts may be assembled by movement of each jaw longitudinally of the axis of its bearing on the block.

2. A universal joint embodying members having oppositely-disposed bifurcated terminals forming jaws, each jaw having an internal cylindrical bearing of substantially uniform diameter from end to end and embracing more than 180° of a circle transversely of the axis of the bearing, and a connecting block having cylindrical bearing surfaces embraced by the jaws and disposed with their axes at right angles to each other, the diameter of the bearing surfaces being uniform and greater than the width of the arms forming the jaws, whereby the jaws and block may be assembled by relative movement longitudinally of the coöperating bearing surfaces.

3. A universal joint embodying members having oppositely-disposed bifurcated terminals forming jaws, each jaw having an internal cylindrical bearing of substantially uniform diameter from end to end, a connecting block having cylindrical bearing surfaces embraced by the jaws and disposed at right angles to each other, said bearing surfaces being of substantially uniform diameter from end to end of the block, whereby the parts may be assembled and separated by movement of the jaws longitudinally of the axes of their bearings on the block, and a restraining member for preventing such movement to maintain the parts in their assembled relation.

4. A universal joint embodying members having oppositely disposed bifurcated terminals forming jaws, each provided with an internal cylindrical bearing surface of uniform diameter throughout, and a connecting block having external cylindrical bearing surfaces which are of uniform diameter throughout, extend to the corners of the block and are disposed with their axes intersecting substantially at right angles to each other and each of which is embraced by the bearing surface of one of said jaws to prevent longitudinal separation of the jaws, one of said jaws being movable onto and off of its bearing surface on the block in the direction of the axis of said surface, substantially as set forth.

5. A universal joint embodying members having oppositely disposed bifurcated terminals forming jaws, each provided with an internal cylindrical bearing surface of uniform diameter throughout, a connecting block having external cylindrical bearing surfaces which are of uniform diameter throughout, extend to the corners of the block and are disposed with their axes intersecting at right angles to each other and each of which is embraced by the bearing surface of one of said jaws to prevent longitudinal separation of the jaws, each of said jaws being movable onto and off of its bearing surface on the block in the direction of the axis of said surface and transversely of the jaw, and means for restraining said jaws against transverse movement on said block, substantially as set forth.

6. A universal joint embodying members having oppositely disposed bifurcated terminals forming jaws, each provided with an internal cylindrical bearing which extends through an arc of more than 180°, and the ends of which are spaced far enough apart to allow the passage between them of the other jaw, and a connecting block having cylindrical bearing surfaces which are disposed with their axes at right angles to each other and each of which is embraced by the bearing of one of said jaws, said block being movable in line with the axis of either one of its cylindrical bearing surfaces into and out of the bearing in the jaws, whereby the parts of the joint may be assembled by movement of said block and one jaw into the other jaw in the direction of the axis of the bearing of said latter jaw, substantially as set forth.

7. A universal joint embodying members having oppositely disposed bifurcated terminals forming jaws, each provided with an internal cylindrical bearing surface of uniform diameter throughout, a connecting block having external cylindrical bearing surfaces which are of uniform diameter throughout, extend to the corners of the block and are disposed with their axes intersecting each other and each of which is embraced by the bearing surface of one of said jaws to prevent longitudinal separation of the jaws, each of said jaws being movable onto and off of its bearing surface on the block in the direction of the axis of said surface and transversely of the jaw and a casing surrounding the jaws and block and having an internal bearing surface to restrain the jaws against bodily transverse movement on said block.

8. A universal joint embodying two members having oppositely disposed bifurcated terminals forming jaws each provided with an internal cylindrical bearing surface of substantially uniform diameter throughout, a connecting block fitting within said jaws and having a cylindrical bearing surface for each jaw of substantially uniform diameter and extending to the corners of the block whereby said block is movable longitudinally of the axes of its bearing surfaces into and out of the respective jaws, and a surrounding casing having an internal spherical bearing surface for restraining the bodily movements of the jaws and block with relation to each other.

9. A universal joint embodying two members having oppositely disposed bifurcated terminals forming jaws each provided with an internal cylindrical bearing surface, of substantially uniform diameter throughout, a connecting block fitting within said jaws and having a cylindrical bearing surface for each jaw of substantially uniform diameter and extending to the corners of the block whereby said block is movable longitudinally of the axes of its bearing surfaces into and out of the respective jaws, and a surrounding casing having an internal spherical bearing surface for restraining the bodily movements of the jaws and block with relation to each other, said casing having circular openings therein for the stems of the jaw members and being free to rotate independently of the jaw members and block.

10. A universal joint embodying two shaft members each having a jaw with an internal cylindrical bearing open at one side but extending through more than half the circumference of the cylinder, and a connecting block having two cylindrical bearing faces of uniform diameter throughout mounted in said bearings, said bearing faces intersecting to form a block rectangular in a plane parallel with the axes of the cylindrical bearing faces.

11. A universal coupling comprising in combination a central element having four cylindrical faces, one merging into another, and coupling members each provided with a fork having inner faces complementally formed with respect to and embracing said faces, the inner faces of each of said forks constituting an internal cylindrical bearing which extends through an arc of more than 180°, said bearings having free lateral sliding movement with respect to the cylindrical faces of the central element, the width of each fork being relatively reduced with respect to the length of the cylindrical face engaged thereby.

12. A shaft coupling comprising a central block having two pairs of cylindrical faces, the faces of each pair being continuously smooth and unbroken and oppositely disposed with respect to each other and the axis of one pair of cylindrical faces intersecting the axis of the other pair at the center of the block, and shaft jaws complementally formed with respect to and embracing said pairs of faces, each of said jaw faces constituting an inner cylindrical bearing which extends through an arc of more than 180°, and each pair being reduced in width with respect to the length of the cylindrical face engaged thereby, said jaws having free lateral and peripheral sliding movement on said faces with respect to each other thereby permitting an angular or axially alined adjustment of said jaws.

ADNA G. BOWEN.

Witnesses:
ABIEL BOWEN,
HELEN C. BOWEN.

Copies of this patent may be obtained for five cents each, by addressing the "Commissioner of Patents, Washington, D. C."